(12) United States Patent
Townsend, IV (10) Patent No.: US 10,774,819 B2
(45) Date of Patent: Sep. 15, 2020

(54) DISPLACEMENT DEVICE WITH FORCE DISPLACEMENT MECHANISM

(71) Applicant: Ernest William Townsend, IV, Scottsdale, AZ (US)

(72) Inventor: Ernest William Townsend, IV, Scottsdale, AZ (US)

(73) Assignee: Dualcore Energy, Inc., Scottsdale, AZ (US)

( * ) Notice: Subject to any disclaimer, the term of this patent is extended or adjusted under 35 U.S.C. 154(b) by 147 days.

(21) Appl. No.: 16/205,067

(22) Filed: Nov. 29, 2018

(65) Prior Publication Data

US 2019/0249644 A1 Aug. 15, 2019

Related U.S. Application Data

(63) Continuation-in-part of application No. 15/895,092, filed on Feb. 13, 2018.

(51) Int. Cl.
*F03G 3/00* (2006.01)
*F03B 17/04* (2006.01)

(52) U.S. Cl.
CPC ............ *F03G 3/00* (2013.01); *F03B 17/04* (2013.01); *F05B 2220/706* (2013.01)

(58) Field of Classification Search
CPC ...... F03B 17/005; F03B 17/02; F03B 17/025; F03B 17/04; F03G 3/00; F03G 7/10
See application file for complete search history.

(56) References Cited

U.S. PATENT DOCUMENTS

| | | | |
|---|---|---|---|
| 3,857,242 A | 12/1974 | Gilmore | |
| 3,952,517 A * | 4/1976 | Decker | F03B 13/145 |
| | | | 60/502 |
| 5,944,480 A | 8/1999 | Forrest | |
| 6,420,794 B1 | 7/2002 | Cao | |
| 6,817,180 B2 | 11/2004 | Newman | |
| 7,134,283 B2 | 11/2006 | Villalobos | |
| 7,573,147 B2 | 8/2009 | Karim | |
| 7,765,804 B2 | 8/2010 | Davis | |
| 8,011,182 B2 | 9/2011 | Hastings | |
| 8,112,992 B2 | 2/2012 | Pirincci | |
| 8,307,642 B2 | 11/2012 | Davis | |
| 8,756,932 B2 | 6/2014 | Pirincci | |
| 8,981,582 B2 | 3/2015 | Grossman | |
| 8,997,475 B2 * | 4/2015 | Ingersoll | F02G 1/02 |
| | | | 138/31 |
| 2002/0149204 A1 | 10/2002 | Rauschenberger | |
| 2003/0059292 A1 | 3/2003 | Baker | |
| 2005/0127681 A1 | 6/2005 | Shaochun | |
| 2006/0042244 A1* | 3/2006 | Villalobos | F03B 17/04 |
| | | | 60/495 |

(Continued)

*Primary Examiner* — Mark A Laurenzi
*Assistant Examiner* — Xiaoting Hu
(74) *Attorney, Agent, or Firm* — Nydegger & Associates (57) ABSTRACT

A system for cyclically lifting a large volume of water includes a piston plate having first and second sides. The water to be lifted exerts a water pressure on the second side of the piston plate, while compressed air held in a pressurized tank exerts an air pressure on the first side of the piston plate. The resultant pressure differential $\Delta p$ is such that the piston plate is biased to move in a particular direction. A force actuator is provided that periodically exerts a force F on the piston plate to overcome the bias of $\Delta p$ and thereby lift the volume of water.

20 Claims, 8 Drawing Sheets

(56) References Cited

U.S. PATENT DOCUMENTS

| | | | |
|---|---|---|---|
| 2009/0235659 A1* | 9/2009 | Lin | F03B 17/005 60/495 |
| 2009/0252563 A1 | 10/2009 | Gillespie | |
| 2009/0293471 A1* | 12/2009 | Davis | F03B 17/00 60/495 |
| 2012/0119508 A1 | 5/2012 | Sparks | |
| 2015/0020518 A1 | 1/2015 | Manoj | |

* cited by examiner

DISPLACEMENT DEVICE WITH FORCE DISPLACEMENT MECHANISM

This application is a continuation-in-part of application Ser. No. 15/895,092, filed Feb. 13, 2018, which is currently pending. The contents of application Ser. No. 15/895,092 are incorporated herein by reference.

FIELD OF THE INVENTION

The present invention pertains generally to machines that drive power generators. In particular, the present invention pertains to machines that cyclically move submerged structures through a liquid, such as water, when movement of the structure is opposed by extremely high pressures. The present invention is particularly, but not exclusively, useful as a device for lifting a specified, vertically-oriented, column of water through a predetermined distance.

BACKGROUND OF THE INVENTION

By definition, energy is the capacity to perform work. From a physics perspective, the energy of an object can be expressed as either potential energy or kinetic energy. For these expressions, potential energy differs from kinetic energy in that potential energy is determined by the position of the object in the earth's gravitational field. On the other hand, kinetic energy is determined by the motion of the object through the earth's gravitational field.

It is well known that when an object of weight W falls from a high point where it has zero velocity, to a low point where it again has zero velocity, the object loses potential energy as it falls. During the fall, however, the object also generates kinetic energy by virtue of its velocity. With this in mind, the machine of the present invention involves considerations for a tradeoff between both forms of energy.

In the gravitational field of a Newtonian reference frame there are two forces that are familiar to everyone. These forces are gravity and buoyancy. As a practical matter, with regard to an object having a predetermined mass and density, there are two characteristics of the gravity and buoyancy forces acting on an object in a gravitational field that are universally agreed upon. One is the fact that they will act on the object at the same time in opposite directions to each other. The other characteristic is that the forces of buoyancy and gravity on an object are constant and cannot be altered.

For an example of the counteracting effects that gravity and buoyancy will have on a buoyant object, consider the case where the object is dropped onto a straight path into a pool of water, from a start point at a predetermined height above the pool. Immediately upon entering the pool, the buoyant force on the object overcomes the gravity force on the object (i.e. its weight). The result here is that the object will decelerate to a rest point in the pool where it will have zero velocity. Unless somehow altered, it will then return along the same path from the submerged rest point to the surface of the poor under the influence of its buoyancy force. In the case of a pool, the object will return to the surface of the pool.

Clearly, in order to repeatedly benefit from the kinetic energy that is generated by a buoyant object during its fall into a pool, the object cannot be left floating in the pool. Instead, it must somehow be returned to its original start point above the surface of the pool. One way to do this is to establish an offset underwater pathway for the object that extends upward and beyond the surface of the pool, back up to the original start point. With such an underwater pathway, instead of stopping at the surface of the pool, a buoyant object will continue along the offset underwater pathway from its submerged rest point to the original start point.

A machine that incorporates such an underwater pathway as suggested above, is disclosed in U.S. patent application Ser. No. 15/677,800 for an invention entitled "Machine Generator with Cyclical, Vertical Mass Transport Mechanism" which was filed on Aug. 15, 2017 by the inventor of the present invention. As disclosed in this earlier filed patent application, there are at least three interrelated considerations to be addressed for the establishment of an underwater pathway. These include: i) providing a bi-level water tank having an upper surface that is level with an original start point at a height above its lower surface; ii) maintaining a height differential between the upper surface and the lower surface; and iii) cyclically reestablishing an underwater pathway that is offset from the object's drop path to accommodate the travel of successive objects along the underwater pathway. The present invention is focused on the last consideration, i.e. cyclically reestablishing the underwater pathway.

Based on the disclosure of U.S. patent application Ser. No. 15/677,800, mentioned above, an important consideration for reestablishing an underwater pathway is the power requirement for repetitively lifting a vertically-oriented column of water in the bi-level tank. In particular, this power requirement arises for two interrelated reasons. Firstly, power is required to prevent drainage from the bi-level tank when both its upper and lower surfaces are exposed. For this purpose a valve mechanism is provided to isolate the lower surface of the bi-level tank from the upper surface by closing off an upper portion of the underwater pathway. This action thus allows the lower surface to be open so an object can enter the tank through the open lower surface. The consequence of this, however, is a rise in the level of the lower surface of the bi-level tank. Secondly, after the object has entered the bi-level tank, power is required by the valve mechanism to open the underwater pathway and allow the object to continue moving along the underwater pathway toward the upper surface, while the lower surface is covered. During this time, while the underwater pathway is open, a volume of air or a solid mass that corresponds to the object's volume is injected into (i.e. created in) the bi-level tank. The purpose here is to displace water in the bi-level tank by lifting a column of water toward the upper surface of the bi-level tank. When this lifting action is completed, the valve mechanism again closes off the underwater pathway and exposes the lower surface. Then, as the air volume is removed from the tank, the lower surface level drops back to where it was before. In particular, as noted above, this is done so that a successive object can enter the bi-level tank.

Specifically, the above described actions regarding upper and lower surface levels are directed to the consideration for maintaining a height differential between the upper surface and the lower surface of the bi-level tank. During an operation, however, this requires lifting a vertically-oriented column of water. Because, the vertically-oriented column of water will inevitably be very heavy, e.g. several tons, the power requirement for the operation of a bi-level tank as considered above will necessarily be substantial.

With the above in mind, it is an object of the present invention is to provide a system for lifting a vertically-oriented column of water which minimizes the power requirement for moving the water column. Another object of the present invention is to provide a system for cyclically lifting a vertically-oriented column of water which can continuously accommodate a succession of objects as they are cycled through a bi-level tank. Still another object of the present invention is to provide a system for lifting a vertically-oriented column of water which is easy to operate, is environmentally "green", and is commercially viable.

SUMMARY OF THE INVENTION

In accordance with the present invention a displacement system (device) is provided to cyclically create and then remove an air volume in a bi-level water tank. Essentially, during a duty cycle of the present invention, air or a solid mass, and water will alternately occupy a same volume of space in the bi-level tank.

Structurally, the bi-level water tank has an upper surface and a lower surface, and it includes a valve system that maintains a head height difference between the two surfaces. During its operation the bi-level water tank functions to establish an underwater pathway along which a buoyant module of volume $V_m$ can travel through the bi-level tank from the lower surface to the upper surface.

In order to receive a module into the tank for travel on the pathway, the lower surface must be exposed (i.e. open). However, when the lower surface is exposed, the pathway must be closed off below the upper surface of the bi-level tank by the valve system. Specifically, this is necessary in order to prevent the drainage of water from the bi-level tank while the lower surface is exposed.

During a duty cycle, as soon as the module enters the bi-level tank through the lower surface, the lower surface level will rise to accommodate the module volume $V_m$ in the bi-level tank. Once the module is in the bi-level tank, the lower surface is then covered and the closure is removed to open the water pathway. Thus, the underwater passageway is reestablished between the lower surface and the upper surface. The module can then exit from the bi-level tank through the upper surface.

It is to be noted, however, that if nothing is done after a module has entered the bi-level tank, the next time the lower surface is re-opened to receive a successive module, the lower surface will have remained raised. The present invention, however, precludes this from happening. Accordingly, the present invention operates to allow the lower surface to return to its former level, so the successive module can be received into the bi-level tank. In particular, this is done by the operation of a displacement system (device) that is submerged in the bi-level tank.

Structurally, the displacement system (device) for the present invention includes a pressurized air tank that preferably is filled with compressed air which is held in the air tank at a predetermined pressure $p_1$. The displacement system (device) also includes a connector that is formed with a chamber. Also, a piston plate which has a first (lower) side and a second (upper) side, is positioned between the pressurized air tank and the connector.

In combination, the first (lower) side of the piston plate is connected to the wall of the bi-level tank by a flexible bellows. Via these bellows, the first (lower) side of the piston plate is positioned in fluid communication with the pressurized air tank. Specifically, this cooperation of structure is provided to allow movements of the piston plate within the bi-level tank, while effectively maintaining a substantially constant pressure $p_1$ against the lower side of the piston plate.

On the other hand, the second (upper) side of the piston plate is engaged with the connector. With this engagement, the chamber of the connector is positioned against the second (upper) side of the piston plate. In this combination, the connector is joined to the wall of the bi-level tank by a flexible pipe. Like the bellows, the flexible pipe allows for movements of the connector together with the piston plate within the bi-level tank. Moreover, via its chamber, the connector establishes direct fluid communication between the entire second (upper) side of the piston plate and the upper water surface level of the bi-level tank. The consequence here is that a pressure $p_2$, which is determined by the head height between the second side of the piston plate and the upper surface of the bi-level tank, can be maintained against the second side of the piston plate. Consequently the second side of the piston plate is constantly under the pressure $p_2$.

It is an important aspect of the present invention that the relationship between $p_1$ and $p_2$ establishes a pressure differential $\Delta p$ on the piston plate which is preferably less than 2 psi ($\Delta p = p_2 - p_1 < 2$ psi). With this pressure differential the piston plate is biased to be moved in a predetermined direction. Importantly, as disclosed below, with this cooperation of structure the work required to move the piston plate with the connector in the bi-level tank can be performed against only the relatively lower pressure differential $\Delta p$, rather than against the much higher pressure $p_2$, alone. The overall result is that the combination of the piston plate and the connector can be moved back and forth through a predetermined distance d in the bi-level tank to displace/replace a volume of water $V_m$ for cycling a succession of modules through the bi-level tank.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1A:
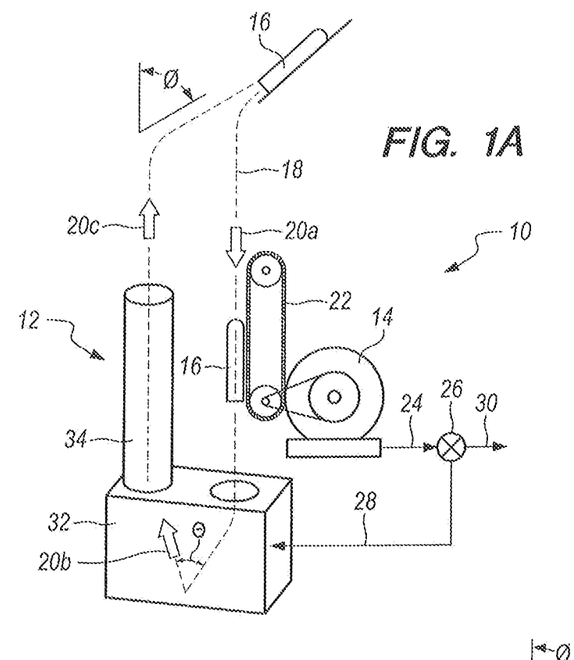
FIG. 1A is a general schematic presentation of a bi-level tank for the present invention with the bi-level tank incorporated into a machine for driving a power generator.

Referring initially to FIG. 1A, a system for generating electric power in accordance with the present invention is shown and is generally designated 10. As shown, the system 10 includes a bi-level tank 12 and an electric generator 14. Also shown, is a module 16 that is moved along a path 18 in a direction indicated by the arrows 20a, 20b and 20c. As intended for the system 10, during a duty cycle, the module 16 is dropped to fall along the path 18 where it engages with a drive mechanism 22 of the electric generator 14. During this engagement the kinetic energy of the falling module 16 is converted into an electric output power 24 from the electric generator 14. The output power 24 is then sent from the electric generator 14 to a summing point 26 where a portion of the output power 24 is returned to the system 10. The returned power is used as an input power 28 for operating the bi-level tank 12 and other mechanical components of the system 10. The difference between the output power 24 and the input power 28 at the summing point 26 is a commercial power 30 which is available for commercial use.

Figure 1B:
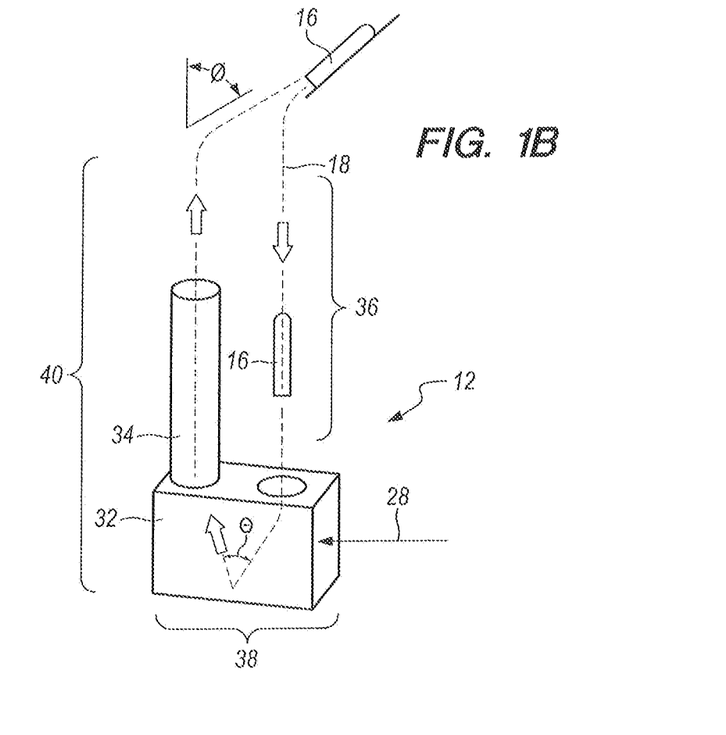
FIG. 1B shows the machine of the present invention with its three operational phases identified for purposes of disclosure.

In both FIG. 1A and FIG. 1B it is shown that the bi-level tank 12 includes a transfer tank 32 and a return tank 34. With this structure in mind, an operation of the present invention can be considered as having a three phase duty cycle. Specifically, in FIG. 1B, the three phases of the duty cycle are identified as: i) a power phase 36 (i.e. a first phase) wherein the module 16 is engaged with the drive mechanism 22 of the electric generator 14 to generate the electric power output 24; ii) a transfer phase 38 (i.e. a second phase) wherein the module 16 is reoriented in the transfer tank 32; and iii) a return phase 40 (i.e. a third phase) wherein the module 16 has left the transfer tank 32 for travel through the return tank 34 to be positioned for the start of a next duty cycle.

Figure 2A:
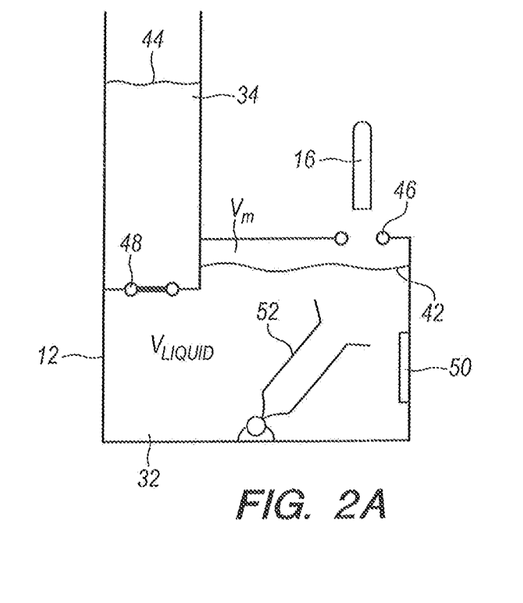
FIG. 2A is a schematic presentation of a bi-level tank in accordance with the present invention with the bi-level tank configured for the first phase of a controlled operation wherein an access port into the bi-level tank is open and a transfer port inside the bi-level tank is closed.
Figure 2B:
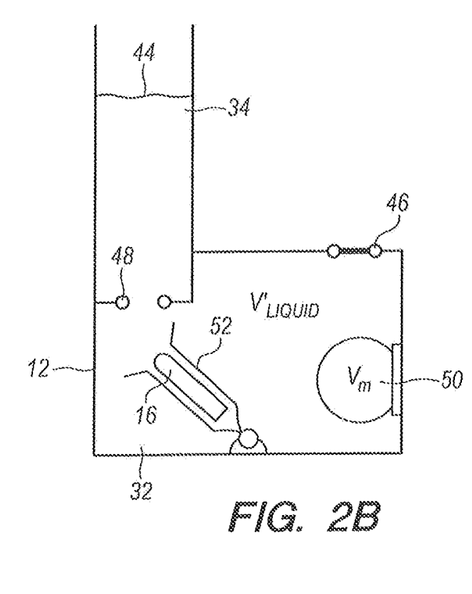
FIG. 2B shows the bi-level tank of FIG. 2A during the second phase of the controlled operation wherein the access port is closed and the transfer port has been opened after the module has entered the bi-level tank, and after the displacement device has been activated.
Figure 2C:
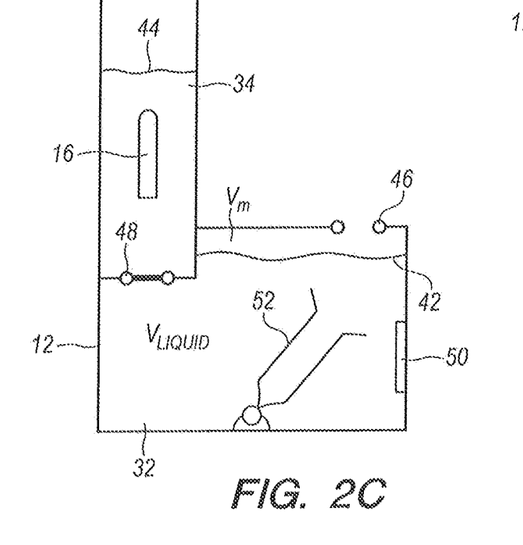
FIG. 2C shows the bi-level tank as in FIG. 2B during the third phase of the controlled operation after the module has entered the return tank and the transfer port has been reclosed and the access port has been reopened so the displacement device can be deactivated and the bi-level tank reconfigured for the first phase.

In greater detail, FIGS. 2A, 2B and 2C respectively describe the configurations of the bi-level tank 12 in each of a duty cycle's three phases. For purposes of disclosure, however, only a single module 16 is considered. Nevertheless, it is to be appreciated that the present invention envisions the simultaneous use of a plurality of modules 16 (e.g. three or more).

In FIG. 2A, a bi-level tank 12 is shown configured for the power phase 36 of a duty cycle. Several aspects of this configuration are noteworthy. For one, both the lower surface level 42 of liquid in the transfer tank 32, and the higher (upper) surface level 44 of liquid in the return tank 34 are exposed. Note: the configuration for the bi-level tank 12 wherein both surfaces 42 and 44 are exposed occurs only when the access port 46 into the transfer tank 32 is open. Importantly, the access port 46 can be open only when the transfer port 48 is closed (as indicated by the solid line in FIG. 2A). An important consequence here is that during the power phase 36 the transfer tank 32 is separated from the return tank 34, i.e, there is no liquid communication between the transfer tank 32 and the return tank 34. Another noteworthy aspect of the configuration for the bi-level tank 12 during the power phase 36 is that a volume of air is established between the lower surface level 42 and the access port 46. Importantly, the volume of this air is equal to $V_m$ of the volume of the module 16. It is also to be noted that a displacement device 50 which is located in the transfer tank 32 is deactivated, and that a pivot unit 52 is empty and positioned to receive a module 16.

In FIG. 2B, the bi-level tank 12 is configured for the transfer phase 38 of the duty cycle. In this phase, the access port 46 is closed and the transfer port 48 is open. A noteworthy aspect of the transfer phase 38 is the fact that only the higher (upper) surface level 44 is exposed. Accordingly, with the transfer port 48 open and the access port 46 closed, the transfer tank 32 is connected in liquid communication with the return tank 34. Two other specific aspects of the transfer phase 38 are significant. For one, the volume of air $V_m$ between the lower surface level 42 and the access port 46 has been replaced with liquid. Specifically, this replacement has occurred because the module 16 with a volume $V_m$ entered the transfer tank 32 before the access port 46 was closed. The other significant aspect here is that the displacement device 50 has been activated to add a displacement volume equal to $V_m$ in the transfer tank 32. Stated differently, a replacement volume $V_m$ (module 16) and a displacement volume $V_m$ (activated displacement device 50) have been added to the transfer tank 32 while the access port 46 has been closed. Further, during this transfer phase 38, the pivot unit 52 has reoriented the module 16 for its return by buoyancy through an open path 18 into the return tank 34.

To begin the return phase 40 of the duty cycle, FIG. 20 shows that the transfer port 48 is reclosed and the access port 46 is reopened. At this point, the transfer tank 32 is again separated from the return tank 34 and the module 16 with its volume $V_m$ has left the transfer tank 32. Thus, as the displacement device 50 is deactivated during the return phase 40, liquid in the transfer tank 32 recedes to reestablish a volume of air $V_m$ between the lower surface level 42 and the access port 46. The bi-level tank 12 is now reconfigured as it was in the power phase 36 to receive the next module 16 in the duty cycle.

From the perspective of liquid volumes in the bi-level tank 12, within each duty cycle, the three phases disclosed above with reference to FIGS. 2A-2C depend on the open/close status of the access port 46 and the transfer port 48. With this in mind, also consider that the transfer tank 32 has a total volume capacity $V_{total}$. For the power phase 36 of the duty cycle, before a module 16 enters the transfer tank 32, the access port 46 is open and the transfer port 48 is closed. In this configuration, the total volume $V_{total}$ of the transfer tank 32 includes the liquid volume $V_{liquid}$ in the transfer tank 32 and the volume of air $V_m$ that is above the lower surface level 42 ($V_{total} = V_{liquid} + V_m$). On the other hand, for the transfer phase 38 of the duty cycle, with the access port 46 closed and the transfer port 48 open, the total volume capacity $V_{total}$ of the transfer tank 32 includes a reduced liquid volume $V_{liquid}$, plus the volume $V_m$ of the activated displacement device 50 and the volume $V_m$ of the module 16 ($V_{total} = V'_{liquid} + 2 V_m$). In the return phase 40 of the duty cycle, after the access port 46 has been reopened and the transfer port 48 has been reclosed, the displacement device 50 is deactivated. Thus, $V_{total}$ again equals the liquid volume $V_{liquid}$ in the transfer tank and the volume of air above the lower surface level 42 that is equal to $V_m (V_{total} = V_{liquid} + V_m)$.

Figure 3:
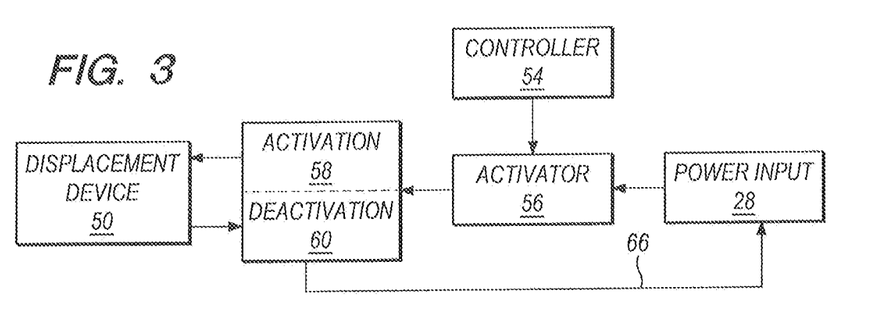
FIG. 3 is a functional schematic presentation of the displacement device.

With specific reference to the displacement device 50, recall that it may have either a pneumatic embodiment or a mechanical embodiment. FIG. 3, however, indicates that the functionality and purpose for both embodiments of the displacement device 50 are substantially similar and require similar structure. For instance, in FIG. 3 it will be seen that a controller 54 is provided for the system 10 that will operate an activator 56. FIG. 3 also shows that the activator 56 is powered by input power 28 that is obtained from the electric generator 14. With these connections, the activator 56 will alternatingly operate both an activation device 58 and a deactivation device 60. Although FIG. 3 shows the activation device 58 and the deactivation device 60 to be separate devices, it is to be appreciated that the activation/deactivation functions of these devices can be performed by a single, consolidated device.

Figure 4A:
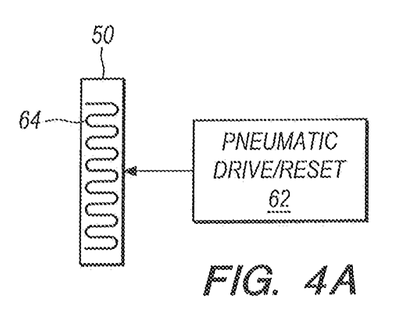
FIG. 4A shows a deactivated configuration for a pneumatic (bladder) displacement device.
Figure 4B:
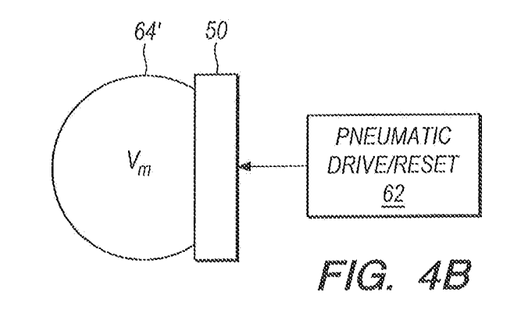
FIG. 4B shows an activated configuration for the pneumatic (bladder) displacement device shown in FIG. 4A.

Referring now to FIGS. 4A and 4B, a pneumatic embodiment for the displacement device 50 is shown. Preferably, the pneumatic displacement device 50 will include a drive/reset mechanism 62 that will inflate/deflate an inflatable member, such as a bladder 64. As disclosed above, the bladder 64 will operate between a first configuration wherein the deactivated bladder 64 is deflated with an effective volume of zero, and a second configuration wherein the activated bladder 64' is inflated to a volume $V_m$. The timing for an inflation or deflation of the bladder 64 will be determined based on the duty cycle for a module 16 which is implemented by the controller 54.

As envisioned by the present invention, an operation of the displacement device 50 with an inflatable/deflatable bladder 64 can be accomplished with either compressed air or steam. It is further envisioned by the present invention that the deflation of a bladder 64 will be accomplished primarily by liquid pressure on the bladder 64 in the transfer tank 32, with the possible assistance of a suction capability from the deactivation device 60. In either case, the air/steam that is evacuated from the bladder 64 can be sent back via a transfer line 66 to the activator 56 (see FIG. 3) for use by the activation device 58 in a subsequent inflation of the bladder 64.

Figure 5A:
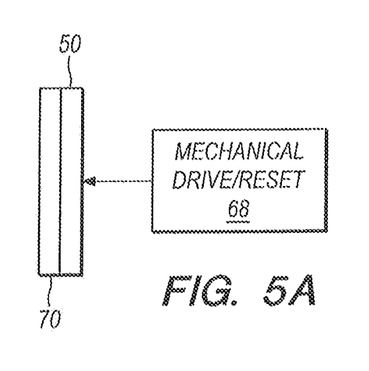
FIG. 5A shows a deactivated configuration for a mechanical (piston) displacement device.
Figure 5B:
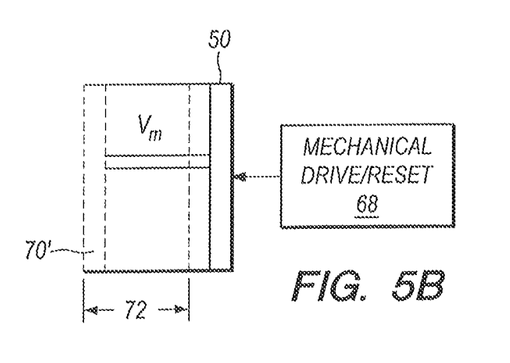
FIG. 5B shows an activated configuration for the mechanical (piston) displacement device shown in FIG. 5A.

The operation for a mechanical embodiment of the displacement device 50 is disclosed with reference to FIGS. 5A and 5B. In this case, the activation/deactivation mechanism 58/60 operates a drive/reset mechanism 68 that moves a structure such as a piston 70. Specifically, during a duty cycle of the module 16, the piston 70 is moved from a first configuration, wherein a zero volume of liquid in the transfer tank 32 is affected by the displacement device 50, to a second configuration wherein a volume $V_m$ of liquid in the transfer tank 32 has been displaced. To do this, the piston 70 is moved through a distance 72 that is sufficient to displace a volume $V_m$ of liquid in the transfer tank 32.

Figure 6:
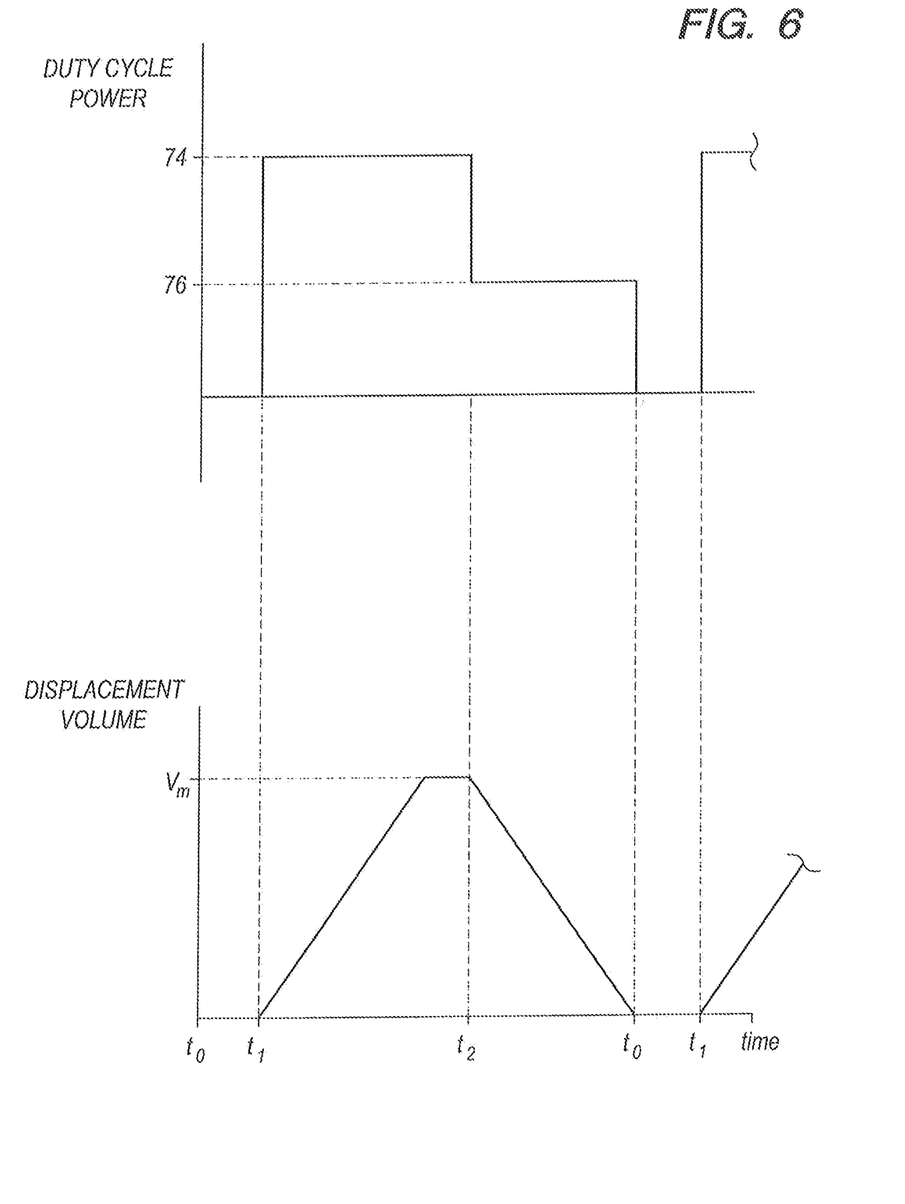
FIG. 6 is a time-line chart showing power requirements and liquid volume displacement changes during the second phase of the controlled operation when configurations of a displacement device, as shown in FIGS. 4A, 4B, 5A and 5B, are made to accommodate the transfer of a module through the bi-level tank.

FIG. 6 shows the power requirements needed for the operation of a displacement device 50 during the transfer phase 38 of a duty cycle for a module 16. FIG. 6 also shows the contemporaneous displacement volume that is created by the displacement device 50 in the transfer tank 32 during the transfer phase 38. As shown in FIG. 6, the second phase 38 begins at a time $t_0$ when the access port 46 is open and the transfer port 48 is closed.

At the beginning of the transfer phase 38, during the time interval between $t_0$ and $t_1$, the access port 46 is closed and the transfer port 48 is open. At the time $t_1$ the displacement device 50 is activated with a drive power 74. With the drive power 74 between $t_1$ and $t_2$ the displacement device 50 achieves and maintains a displacement volume $V_m$ in the transfer tank 32. At the time $t_2$, however, the displacement device 50 is deactivated. As indicated above, after the time $t_2$, it may be necessary to apply a reset power 76 that will assist in diminishing the volume of the displacement device 50. In any event, at the time $t_2$ the displacement device 50 is deactivated. The displaced volume of liquid in the transfer tank 32 is then reduced to zero, at or before $t_0$, for a repeat of the transfer phase 38.

Figure 7A:
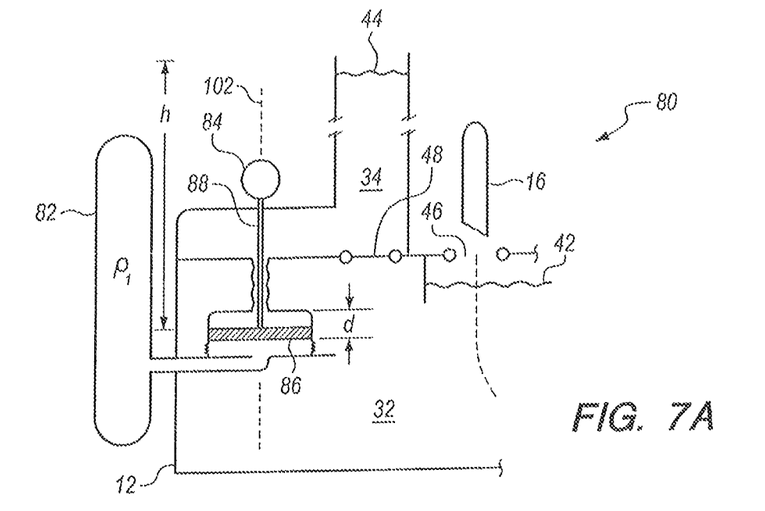
FIG. 7A is an elevation view of the displacement device positioned in the bi-level tank and configured with its piston plate at a first location when the bi-level tank is configured to receive a module at the beginning of a duty cycle.

An alternate embodiment for operating the bi-level tank 12 in accordance with the present invention, is a system 80 as shown in FIG. 7A. There it will be seen that system 80 includes a pressure tank 82 for holding a fluid, preferably compressed air, at a very high pressure $p_1$. In particular, the pressure tank 82 is preferably located external to the bi-level tank 12, and it will have a fluid capacity that is sufficiently large to maintain $p_1$ nominally constant despite cyclical changes in its overall volume. Also, the system 80 includes a force actuator 84 and a piston plate 86. As shown, the piston plate 86 is submerged in the transfer tank 32 of the bi-level tank 12, and it is positioned between the force actuator 84 and the pressure tank 82.

Figure 7B:
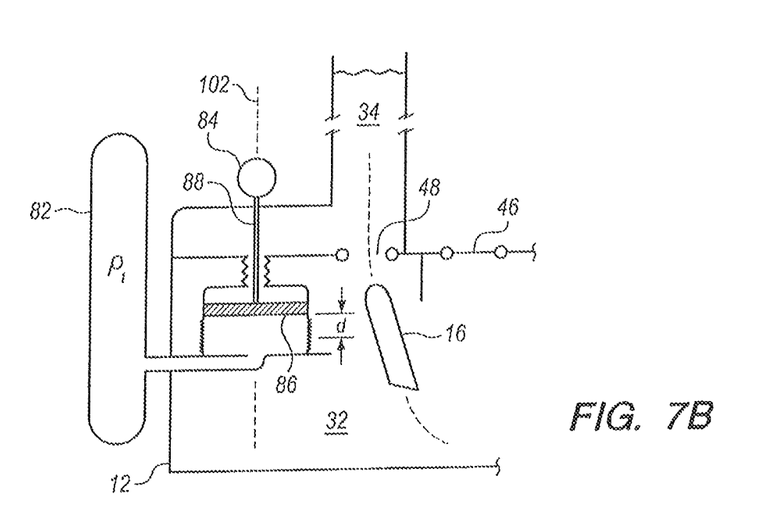
FIG. 7B is a view of the displacement device shown in FIG. 7A with the piston plate at a second location after the displacement device has displaced a volume $V_m$ of water in the bi-level tank with a same volume $V_m$ of compressed air during a duty cycle.

Still referring to FIG. 7A, it will be seen that the system 80 further includes a force transfer mechanism 88 that interconnects the force actuator 84 with the piston plate 86. Preferably, for this combination, the force actuator 84 will be either a hydraulic ram or a hoist, and the force transfer mechanism 88 will respectively be either a rod that works with the hydraulic ram, or a cable that works with the hoist. In either case, these components are well known in the art for the use envisioned for the present invention. Specifically, the force actuator 84 is to be used to cyclically apply a force F against the piston plate 86, to thereby move it back and forth through a distance d (i.e. distance 72) between two locations inside the transfer tank 32. In detail, one location for the piston plate 86 is shown in FIG. 7A and the other location is shown in FIG. 7B.

Figure 8:
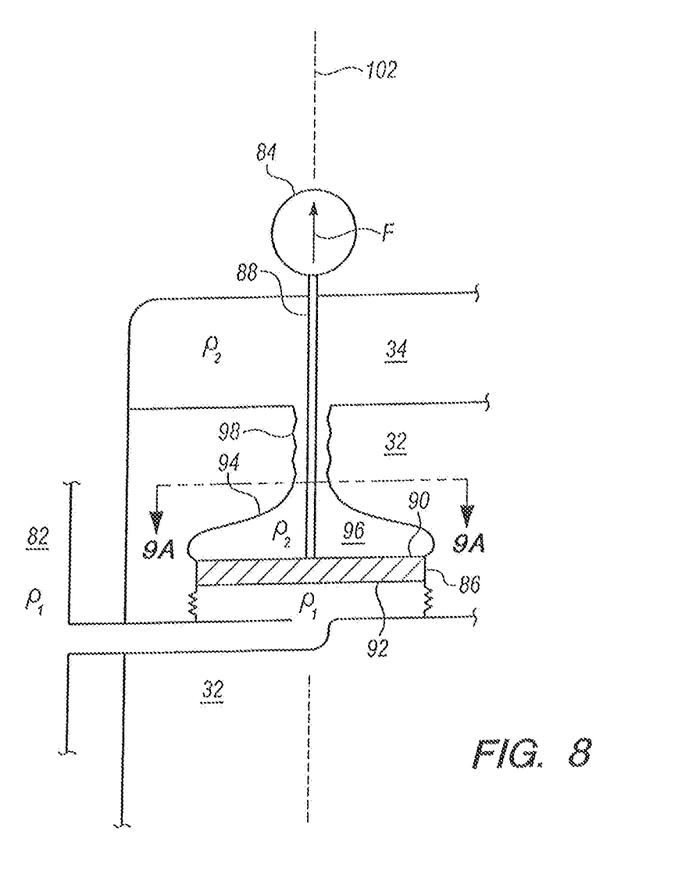
FIG. 8 is an enlarged elevation view of the displacement device shown in its operational pressure/force environment during a duty cycle.

Components for the system 80 and their cooperation with each other are best appreciated in greater detail with reference to FIG. 8. In FIG. 8 it will be seen that the piston plate 86 has an upper side 90 and a lower side 92. Typically, the upper side 90 and the lower side 92 of the piston plate 86 will have a same area $A_1$.

It will also be seen in FIG. 8 that the system 80 includes a connector 94 which is formed with a chamber 96. Also shown is a flexible pipe 98 that connects the chamber 96 of the connector 94 in fluid communication with the return tank 34. The connector 94 is also engaged with the piston plate 86 so that the chamber 96 of the connector 94 is continuously in fluid contact with the upper side 90 of the piston plate 86, Furthermore, a flexible bellows 100 is provided to establish fluid contact between the lower side 92 of piston plate 86 and compressed air in the pressure tank 82.

The important consequence of the cooperation of structure disclosed above for the system 80 is that a pressure differential $\Delta p$ is established across the piston plate 86. In detail, compressed air from the pressure tank 82 will experience slight variations in pressure $p_1$ against the lower side 92 of piston plate 86 whenever piston plate 86 moves. In detail, as the piston plate 86 moves to displace a volume of water $V_{mw}(V_{mw}=V_m)$, a same volume of air in the pressure tank 82, $V_{ma}$, will be displaced from the pressure tank 82. For example, consider a structure wherein the pressure tank 82 has a fluid volume that is 100 times greater than $V_m$. In this case, when the piston plate 86 displaces $V_m$ in the transfer tank 32, the fluid pressure $p_1$ in the pressure tank 82 will be decreased by 1%. On the other hand, pressure in the chamber 96 of connector 94 against the upper side 90 of piston plate 86 will essentially remain relatively close to the pressure $p_2$ which is determined by the head height h between the upper surface 44 of the return tank 34 and the upper side 90 of the piston plate 86. In their relationship with each other $\pm\Delta p=p_2-p_2$. Preferably, $\Delta p$ will be less than about 2 psi. Due to the compression and extension characteristics of both the flexible pipe 98 and the flexible bellows 100, $\Delta p$ will be nominal and it will vary minimally during an operation of the system 80.

During an operational duty cycle of the system 80, the water pressure in the transfer tank 32 will vary substantially. In fact, it will vary between a very high pressure $p_2$ that is determined by the head height h of the upper surface 44 of return tank 34 during the transfer phase 38, and a much lower pressure determined by a minimal head height from the lower surface 42 of the transfer tank 32. During the return phase 40 of the duty cycle, the piston plate 86 between the connector 94 and the pressure tank 82 will not be directly affected by these pressure changes in the transfer tank 32. The outside pressure on the connector 94 from water in the transfer tank 32, however, will be greatly affected by these changes.

Figure 9A:
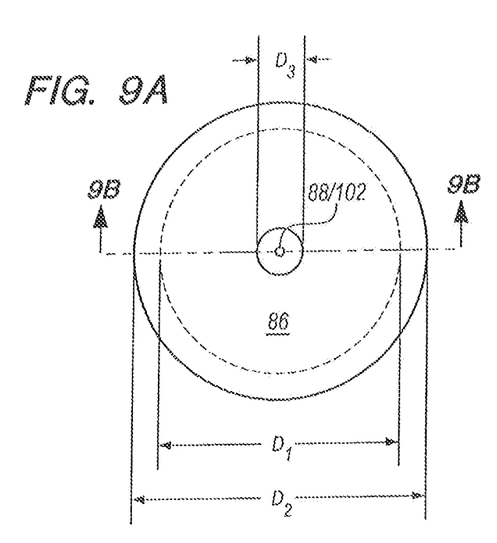
FIG. 9A is a top plan view of the connector positioned over the piston plate (inside dashed line) as seen along the line 9A-9A in FIG. 8.

When referring to FIG. 9A it is to be appreciated that the outside of connector 94 experiences the pressure $p_2$ during the transfer phase 38. For disclosure purposes, it is also necessary to consider an equivalent area $A_2$ that can be identified for the connector 94. In particular, the area $A_2$ is important when considering movements of the connector 94 along the axis 102. Specifically, the area $A_2$ is equal to a projection of the connector 94 onto a plane that is perpendicular to the axis 102. Thus, $A_2$ is an effective area for use in considering forces that will resist movements of the connector 94 in the transfer tank 32. As shown in FIG. 9A the area $A_3$ is the cross sectional area of the flexible pipe 98 in this same plane. $A_3$, however, is not a part of the area $A_2$. Nevertheless, as a general statement, $A_1=A_2$.

Recall that $A_1$ is the surface area of both the upper side 90 and the lower side 92 of the piston plate 86. With these various dimensions in mind, in a preferred embodiment of the present invention, it happens that a force equal to $p_1A_1$, which is due to compressed air from the pressure tank 82, will act against the lower side 92 of the piston plate 86. At the same time a force equal to $p_2A_1$, which is due to water pressure in the return tank 34, will act against the upper side 90 of piston plate 86. Note: $\Delta p$ is determinative of this force differential, and in comparison with the forces themselves, $\Delta p$ will be nominal (e.g. $\Delta p<2$ psi).

An operation of the system 80 will be best appreciated with reference to FIGS. 7A and 7B. As shown in FIG. 7A, when a module 16 is about to enter the transfer tank 32 to thereby begin the transfer phase 38, the access port 46 is open, the transfer port 48 is closed, and the piston plate 86 will be in its first location. Once the module 16 has entered the transfer tank 32, however, the access port 46 is immediately closed and the transfer port 48 is opened. An important consequence of this transition is the change in pressure within the transfer tank 32. In particular, water pressure in the transfer tank 32 immediately changes from a relatively low value under the lower surface 42 (e.g. near atmospheric), to an extremely high value $p_2$ due to a head height h that extends downward from the upper surface 44.

With reference to FIG. 7B it is to be appreciated that water pressure on the connector 94 during the transfer phase 36 will equal $p_2$. Thus, in order to move the piston plate 86 from its first location (FIG. 7A) through the distance d to its second location (FIG. 7B) a resistance force equal to $p_2A_1$ acting on the connector 94 must be overcome. As recognized by the present invention, the force $p_2A_1$ will be considerable. Accordingly, a force $p_1A_1$ is created by compressed air from the pressure tank to counter the active force $p_2A_1$.

The import here is that when a force F from the force actuator 84 is not acting on the piston plate 86, a bias force created by $\Delta p$ (i.e. $\Delta p=p_1A_1\pm p_2A_1$) will alone determine the direction of movement for the piston plate 86. On the other hand, when a force F is applied to the piston plate 86 by the force actuator 84, the piston plate 86 will move in the direction of the force F. In these actions, the relatively small bias force created by $\Delta p A_1$ and hydrodynamic drag forces on the connector 94 are the predominant forces opposed by the force F. Thus, when F is applied, primarily because of the relatively small bias force $\Delta p A_1$, the piston plate 86 can be moved in the direction of force F with a minimized power requirement.

In FIG. 8, the piston plate 86 is shown in its first location on the axis 102 at the time the force F begins to pull the piston plate 86 through the distance d. With reference to FIG. 9A and the relationship between the area $A_1$, $A_2$ and $A_3$ disclosed above, it is to be appreciated that with this movement, the product of the area $A_2$ defined by the connector 94 and the distance d (i.e. $dA_2$) will define a displacement volume in the transfer tank 32 that needs to equal $V_m$, the volume of module 16 ($dA_2=V_m$). The forces that are needed to accomplish this are applied directly against the piston plate 86, i.e. upper side 90 and lower side 92.

With force requirements in mind, at least two important peripheral considerations for the structure of connector 94 are noteworthy. These are: i) the hydrodynamic shape of the connector 94 (or an alternate embodiment 94' shown in FIG. 9B), which will influence drag forces on the connector 94 mentioned above, and ii) the cross section interior diameter $D_3$ of the flexible pipe 98.

Figure 9B:
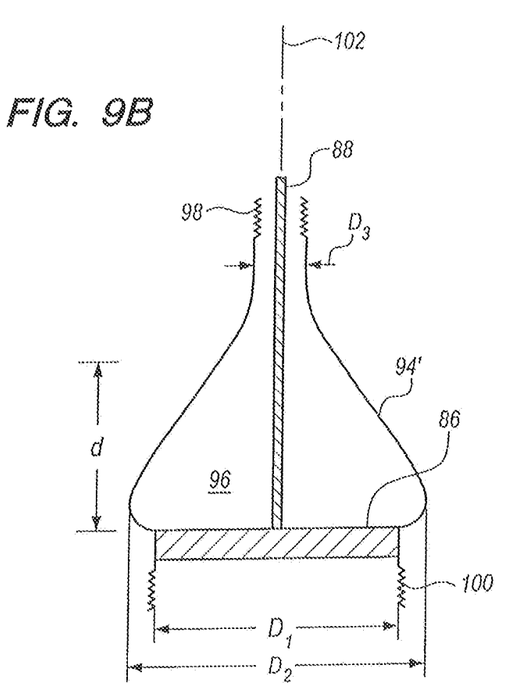
FIG. 9B is a cross section view of the connector for the present invention as seen along the line 9B-9B in FIG. 9A.

Insofar as the hydrodynamic shape of the connector 94 is concerned, rather than presenting a flat or relatively flat plate area which opposes movements of the connector 94 in response to the application of the cyclic force F, the connector 94' is preferably designed with a coefficient of drag in mind that will minimize the drag force that is generated on the connector 94'. Despite the relatively short distance d through which the connector 94' will be moved (e.g. approximately 1 ft.), the necessity for a rapid movement of connector 94' may make this a factor of interest.

With regard to the cross section area of the flexible pipe 98, a movement of the piston plate 86 in response to a force F will not remove water from the chamber 96 of the connector 94. Instead, however, it will remove some of the water that is in the flexible pipe 98. With this in mind $d_3$ can be optimized. Moreover, the increase in $D_2$ for $A_2$ that is needed to accommodate the larger $D_3$ can be minimal in comparison with the diameter $D_1$ for area $A_1$.

An overall summary for the operation of the system 80 is provided with reference to the FIGS. 9A, 9B, 10A and 10B. In detail, FIGS. 9A and 9B graphically show the relationship between the areas $A_{1-3}$ and their respective diameters $D_{1-3}$. For disclosure purposes, the areas $A_{1-3}$ have been considered to be circular and therefore the respective diameters $D_{1-3}$ are representative. The present invention, however, recognizes that surfaces with other shapes are suitable for purposes of the present invention. The importance of the various areas $A_{1-3}$ disclosed is in their relationships with each other and the forces that act on them.

When considering the various force relationships involved for the present invention it is important to recall the following:

$$p_2(\text{pressure under surface } \mathbf{44}) > p_1(\text{compressed air pressure})$$

$$(p_2 - p_1) = \Delta p > 0$$

and $$\Delta p A_1 (a \text{ bias force}) < F$$

Figure 10A:
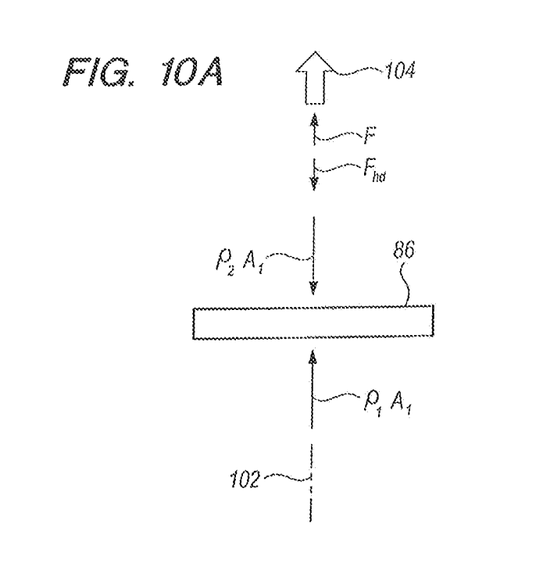
FIG. 10A is a free-body diagram of the predominant forces acting on the piston plate of the present invention under the influence of a force F imposed by a force actuator.

With reference to FIG. 10A, the forces that act directly on the piston plate 86 are shown aligned along the axis 102 when a force F is applied to the piston plate 86. It will be understood that FIG. 10A shows a dynamic condition wherein the piston plate 86 is being moved from its first location to its second location. In this condition, the force F is shown acting in an upward direction indicated by arrow 104. In opposition to F, the hydrodynamic drag force $F_{hd}$ and the water pressure force $p_2 A_1$ act in a downward direction indicated by arrow 106. The compressed air force $p_1 A_1$, like the force F, acts in an upward direction. Thus, when a force F is applied on the piston plate 86, it is moved upwardly through a distance d in the direction of arrow 104. This moves the piston plate 86 from its first location to its second location. This occurs because:

$$F + p_1 A_1 > F_{hd} + p_2 A_1$$

An important consequence of this condition is that a volume of compressed air $V_{ma}$ from the pressure tank 82 replaces a volume of water $V_{mw}$ in the transfer tank 32. Because the transfer port 48 is open at this time, the displaced volume of water $V_{mw}$ will be forced into the return tank 34. Importantly, $V_{ma} = V_{mw} = V_m$.

Figure 10B:
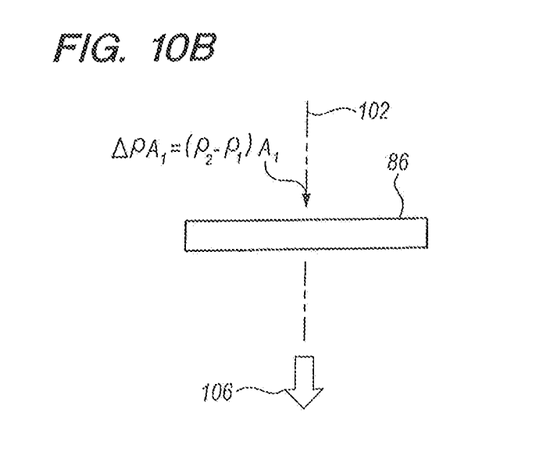
FIG. 10B is a free-body diagram of forces acting on the piston plate when the force F shown in FIG. 10A is zero.

FIG. 10B shows the condition when F is removed. In the absence of a force F, because $p_2$ is greater than $p_1$, the most predominant force acting on the piston plate 86 is the bias force $(p_2 - p_1) A_1$. This bias force always acts downwardly on the piston plate 86 in the direction of arrow 106. The consequence here is that the piston plate 86 is returned to its first location, and the volume $V_{ma}$ previously occupied by compressed air is removed from the transfer tank 32. Thus, when the access port 46 is reopened, the transfer tank 32 is reconfigured with its lowered surface 42 ready to receive another module 16.

While the particular Displacement Device with Force Displacement Mechanism as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A system for cyclically lifting and lowering a volume of water $V_m$ in a bi-level water tank, the system comprising:
    a piston plate having a first side and a second side and defining an axis, wherein the piston plate is constrained for axial movements through a predetermined axial distance d in directions perpendicular to the sides of the piston plate, and wherein the piston plate is submerged in the water at a depth h from an exposed surface of the water;
    a pressure tank for holding a fluid under pressure $p_1$ against the first side of the piston plate, wherein $p_1$ is opposed by a water pressure $p_2$ exerted against the second side of the piston plate to establish a constant pressure differential p on the pressure plate;
    a force actuator for generating a force F; and
    a force transfer mechanism interconnecting the force actuator with the piston plate for intermittently exerting the force F on the piston plate, to periodically overcome $\Delta p$ and move the piston plate through the predetermined distance d, to reciprocally exchange a volume of water $V_{mw}$ in the bi-level tank with a volume of fluid $V_{ma}$ from the pressure tank and vice versa, for lifting and lowering the water volume $V_m$, where $V_m = V_{mw} = V_{ma}$.

2. The system of claim 1 wherein an area $A_1$ is defined on the first side of the piston plate and on the second side of the piston plate, and wherein the water pressure $p_2$ is exerted over the area $A_1$ on the second side of the piston plate, wherein a force $p_2 A_1$ opposes a force $p_1 A_1$ to constrain the piston plate at a first location on the axis.

3. The system of claim 2 wherein $p_2$ is greater than $p_1$, and wherein the combined forces of F and $p_1 A_1$ are greater than the force $p_2 A_1$ to move the piston plate through the axial distance d from the first location to a second location on the axis when the force F is applied $(p_1 A_1 + F > p_2 A_1)$, and to allow the piston plate to return to the first location when the force F is not applied $(p_1 A_1 < p_2 A_1)$.

4. The system of claim 2 wherein $p_1$ is greater than $p_2$, and wherein the combined forces of F and $p_2 A_1$ are greater than the force $p_1 A_1$ to move the piston plate through the axial distance d from the first location to a second location on the axis when the force F is applied $(p_2 A_1 + F > p_1 A_1)$, and to allow the piston plate to return to the first location when the force F is not applied $(p_2 A_1 < p_1 A_1)$.

5. The system recited in claim 2 wherein the bi-level tank has an upper surface and a lower surface and the system further comprises:
    a flexible pipe having an upper end and a lower end, wherein the upper end of the flexible pipe is connected with the bi-level tank to establish fluid communication between the flexible pipe and the upper surface of the bi-level tank;
    a connector formed with an opening at an upper end thereof and an opening at a lower end thereof with a chamber formed therebetween, wherein the connector defines an area $A_2$, and wherein the upper end of the connector is connected to the lower end of the flexible pipe and the lower end of the connector is connected to the second side of the piston plate to position the chamber of the connector against the second side of the piston plate to establish fluid communication between the second side of the piston plate and the upper surface of the bi-level tank via the flexible pipe to maintain the pressure $p_2$ against the second side of the piston plate; and a flexible bellows interconnecting the piston plate with the pressure tank to maintain the pressure $p_1$ against the first side of the piston plate.

6. The system recited in claim 5 wherein the upper surface of the bi-level tank is periodically isolated from the lower surface to change the pressure in a lower portion of the bi-level tank from $p_2$ to a lower pressure relative to the lower surface of the bi-level tank.

7. The system recited in claim 5 wherein the force actuator is selected from the group consisting of a hydraulic ram and a hoist, and wherein the force transfer mechanism is selected from the group consisting of a rod and a cable.

8. The system recited in claim 5 wherein $A_1=A_2$, wherein $\Delta p$ is less than 2 psi, wherein $p_1$ and $p_2$ vary in operation, wherein the fluid for exerting the pressure $p_1$ against the first side of the piston plate is compressed air, and wherein $V_m$ is equal to $dA_2$ and $A_2$ is greater than 40 ft$^2$.

9. A system for cyclically controlling a fluid pressure differential to move a fluid volume $V_m$, the system comprising:
- a piston plate having a first side and a second side and defining an axis, wherein the piston plate is constrained for axial movements through a predetermined axial distance d in directions perpendicular to the sides of the piston plate;
- a pressure tank for holding a first fluid at a first pressure $p_1$, wherein the pressure tank is connected in fluid communication with the first side of the piston plate to exert the first pressure $p_1$ against an area $A_1$ defined on the first side of the piston plate while a second fluid exerts a second pressure $p_2$ against an area $A_1$ defined on the second side of the piston plate, wherein $p_2$ is greater than $p_1$, and wherein a force $p_2A_1$ opposes a force $p_1A_1$ constrain the piston plate at a first location on the axis; and
- a means for periodically applying a force F on the piston plate, wherein the combined forces of F and $p_1A_1$ are greater than the force $p_2A_1$ to move the piston plate through the axial distance d from the first location to a second location on the axis when the force F is applied ($p_1A_1+F > p_2A_1$), and to allow the piston plate to return to the first location when the force F is not applied ($p_1A_1 < p_2A_1$).

10. The system recited in claim 9 wherein the second fluid is held in a bi-level tank having an upper surface and a lower surface and the system further comprises:
- a flexible pipe having an upper end and a lower end, wherein the upper end of the flexible pipe is connected with the bi-level tank to establish fluid communication between the flexible pipe and the upper surface of the bi-level tank;
- a connector formed with an opening at an upper end thereof and an opening at a lower end thereof with a chamber formed therebetween, wherein the connector defines an area $A_2$, and wherein the upper end of the connector is connected to the lower end of the flexible pipe and the lower end of the connector is connected to the second side of the piston plate to position the chamber of the connector against the second side of the piston plate to establish fluid communication between the second side of the piston plate and the upper surface of the bi-level tank to maintain the pressure $p_2$ against the second side of the piston plate; and
- a flexible bellows interconnecting the piston plate with the pressure tank to maintain the pressure $p_1$ against the first side of the piston plate.

11. The system recited in claim 10 wherein the piston plate is submerged in the second fluid to exert the second pressure $p_2$ against $A_1$ on the second side of the piston plate, to create a pressure differential $\Delta p$ on the piston plate ($\Delta p=p_2p_1$), wherein $\Delta p$ is less than 2 psi, and wherein the force F is greater than a force $\Delta pA_1$ when F is applied to move the piston plate from the first location to the second location to displace a volume $V_m$ of the second fluid.

12. The system recited in claim 11 wherein the first fluid is a gas and the second fluid is a liquid.

13. The system recited in claim 12 wherein the upper surface of the bi-level tank is periodically isolated from the lower surface to change the pressure in a lower portion of the bi-level tank from $p_2$ relative to the upper surface of the bi-level tank to a lower pressure relative to the lower surface of the bi-level tank.

14. The system recited in claim 11 wherein $A_1=A_2$, wherein $\Delta p$ is less than 2 psi, wherein $p_1$ and $p_2$ will vary in operation during each duty cycle, wherein the first fluid for exerting the pressure $p_1$ against the first side of the piston plate is compressed air, and wherein $V_m$ is equal to $dA_2$ and $A_2$ is greater than 40 ft$^2$.

15. The system recited in claim 10 wherein the means for applying the force F on the piston plate comprises:
- a force actuator mounted on the bi-level tank; and
- a force transfer mechanism having a first end engaged with the force actuator and a second end attached to the piston plate, wherein the force transfer mechanism passes through the flexible pipe and the force actuator exerts the force F on the piston plate, wherein the force actuator is selected from the group consisting of a hydraulic ram and a hoist, and wherein the force transfer mechanism is selected from the group consisting of a rod and a cable.

16. A system for cyclically controlling a fluid pressure differential to move a fluid volume $V_m$, the system comprising:
- a piston plate having a first side and a second side and defining an axis, wherein the piston plate is constrained for axial movements through a predetermined axial distance d in directions perpendicular to the sides of the piston plate;
- a pressure tank for holding a first fluid at a first pressure $p_1$, wherein the pressure tank is connected in fluid communication with the first side of the piston plate to exert the first pressure $p_1$ against an area $A_1$ defined on the first side of the piston plate perpendicular to the axis;
- a connector formed with an opening at an upper end thereof and an opening at a lower end thereof with a chamber formed therebetween, wherein the connector defines an area $A_2$ perpendicular to the axis, wherein the lower end of the connector is connected in fluid communication with the second side of the piston plate to exert a second pressure $p_2$ against the second side of the piston plate, and wherein $p_2$ is determined by the depth h of the piston plate from an exposed surface of the second fluid, and $p_2$ is greater than $p_1$; and
- a force actuator for periodically applying a force F on the piston plate, wherein the combined forces of F and $p_1A_1$ are greater than a force $p_2A_1$ to move the piston plate through the axial distance d from a first location to a second location on the axis when the force F is applied ($p_1A_1+F > p_2A_1$), and to allow the piston plate to return to the first location when the force F is not applied ($p_1A_1 < p_2A_1$).

17. The system recited in claim 16 wherein the second fluid is held in a bi-level tank having an upper surface and a lower surface and the system further comprises:
   a flexible pipe having an upper end and a lower end, wherein the lower end of the flexible pipe is connected with the opening at the upper end of the connector and the upper end of the flexible pipe is connected to the bi-level tank to establish fluid communication between the chamber of the connector and the upper surface of the bi-level tank to exert the pressure $p_2$ against the second side of the piston plate; and
   a flexible bellows interconnecting the first side of the piston plate with the pressure tank to maintain the pressure $p_1$ against the first side of the piston plate, wherein the flexible pipe and the flexible bellows cooperate to allow joint axial movements of the piston plate and the connector in combination with the flexible pipe and the flexible bellows.

18. The system recited in claim 17 wherein: the force actuator is mounted on the bi-level tank; and further comprising a force transfer mechanism having a first end engaged with the force actuator and a second end attached to the piston plate, wherein the force transfer mechanism passes through the flexible pipe and the force actuator pulls on the piston plate to exert the force F thereon.

19. The system recited in claim 17 wherein $A_1=A_2$, wherein $V_m$ is equal to $dA_2$, wherein $A_2$ is greater than 40 ft$^2$, and wherein $\Delta p$ is less than 2 psi.

20. The system recited in claim 16 wherein the second fluid is held in a bi-level tank having an upper surface and a lower surface and wherein the upper surface of the bi-level tank is periodically isolated from the lower surface to change the pressure in a lower portion of the bi-level tank from $p_2$ relative to the upper surface of the bi-level tank to a lower pressure relative to the lower surface of the bi-level tank.

* * * * *